Jan. 26, 1971

J. R. KITTRELL 3,558,471

HYDROTREATING CATALYST COMPRISING AN ULTRA-STABLE
CRYSTALLINE ZEOLITIC MOLECULAR SIEVE
COMPONENT, AND METHODS FOR MAKING
AND USING SAID CATALYST

Filed Sept. 13, 1968

INVENTOR
JAMES R. KITTRELL
BY R. H. Davies
ATTORNEY

3,558,471
HYDROTREATING CATALYST COMPRISING AN ULTRASTABLE CRYSTALLINE ZEOLITIC MOLECULAR SIEVE COMPONENT, AND METHODS FOR MAKING AND USING SAID CATALYST
James R. Kittrell, El Cerrito, Calif., assignor to Chevron Research Company, San Francisco, Calif., a corporation of Delaware
Filed Sept. 13, 1968, Ser. No. 759,672
Int. Cl. C10g *13/04*
U.S. Cl. 208—59                                17 Claims

ABSTRACT OF THE DISCLOSURE

A catalyst comprising an ultra-stable crystalline zeolitic molecular sieve component substantially free of any catalytic metal or metals, a silica-containing gel component, a Group VI hydrogenating component, and a Group VIII hydrogenating component, and methods for making and using said catalyst.

INTRODUCTION

Figure 1:
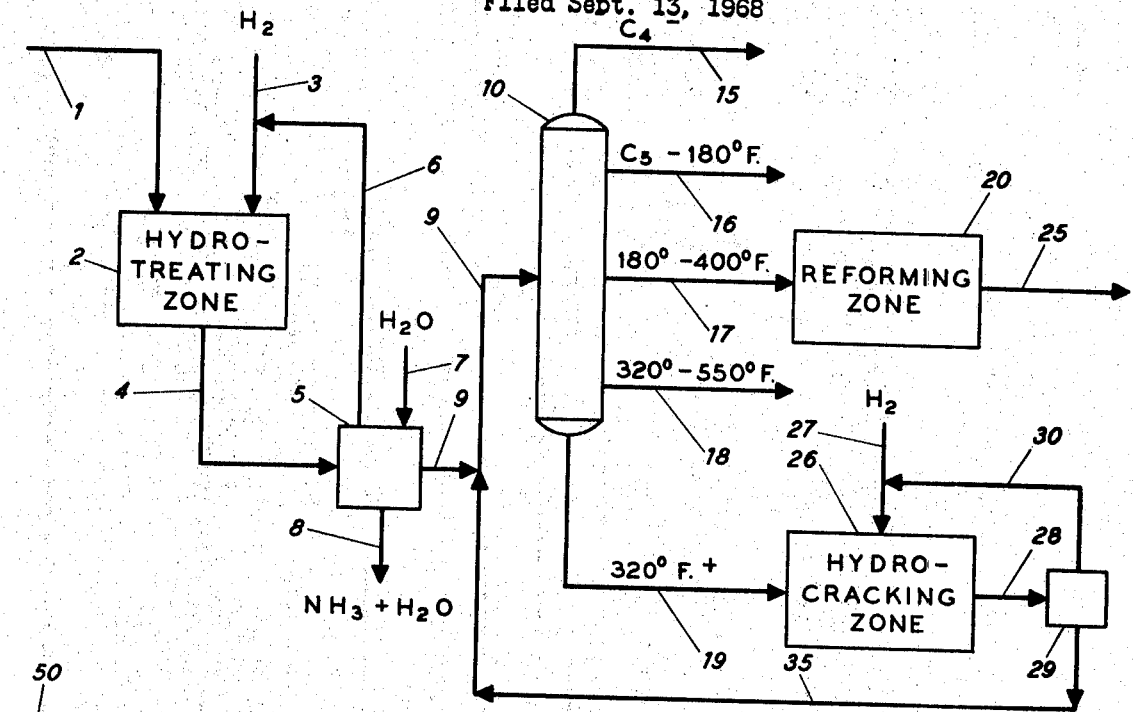

This invention relates to catalytic hydrocracking of petroleum distillates and solvent-deasphalted residua to produce high-value fuel products, including jet fuels and gasoline.

PRIOR ART

It is known that a catalyst may comprise a crystalline zeolitic molecular sieve component associated with other catalyst components. It is also known that at least some of said other catalyst components may be in the form of a matrix in which the molecular sieve component is dispersed. It is also known that such catalysts may be used for such reactions as catalytic cracking, hydrocracking, and hydrodesulfurization. Representative prior art patents disclosing one or more of the foregoing matters include: U.S. Pat. 3,140,251; U.S. Pat. 3,140,253; British Pat. 1,056,301; French Pat. 1,503,063; French Pat. 1,506,793.

There has been a continuing search for further improvements in such catalysts, particularly for hydrocracking and hydrofining uses. It is known that the results of catalyst modifications often are largely unpredictable, and the increased number of possible modifications in catalysts containing an additional molecular sieve component does not diminsh the unpredictability. A significantly improved result in a test with a modified catalyst containing a molecular sieve component and other catalyst components seldom would have been predictable before the test, particularly in hydrocracking and hydrofining applications of such catalysts, and is a much-desired goal.

It is known from the paper "A New Ultra Stable Form of Faujasite," by C. V. McDaniel and P. K. Maher, of Washington Research Centre, Davison Division, W. R. Grace & Co., Clarksville, Maryland, presented at Molecular Sieve Conference, Society of Chemical Industry, London, England, April 1967, and from the published preprint of said paper, that ultra-stable faujasites with a sodium content below about 3 weight percent, calculated as $Na_2O$, may be prepared that have a substantially higher temperature of faujasite structure collapse than previously known forms of faujasites having a correspondingly low sodium content. The paper indicates that as sodium is removed from the sodium form of faujasite, a critical point is reached at around 3 weight percent $Na_2O$, after which previously known forms of faujasite suffer structural collapse at temperature levels that decrease rapidly as additional sodium is removed. For example, the previously known type Y faujasites were structurally stable at a temperature of about 850° C. at a sodium content level of about 3.2 weight percent, calculated as $Na_2O$, but further sodium removal resulted in a marked decrease in structural thermal stability, to the extent that when the sodium level was reduced to about zero, the structural collapse temperature had dropped to about 600° C. The paper further indicates that the ultra-stable zeolites prepared by the procedures given in the paper have increasing structural thermal stability as the sodium level is reduced below about 3 weight percent $Na_2O$, to the extent that when the sodium level is reduced to about zero, the structural collapse temperature exceeds 1000° C. The paper further indicates that the unit cell size of the ultra-stable faujasites, containing less than about 3 weight percent sodium, calculated as $Na_2O$, is less than that of the corresponding previously known unstabilized faujasites, due to cell shrinkage as sodium is removed and the faujasites are subjected to the other preparation procedures given in the paper. The differences in unit cell size in angrstoms (A.) between the low-sodium-content ultra-stable faujasites and the previously known unstabilized faujasites, for various faujasite silica-alumina ratios, is given in the paper by the following curves:

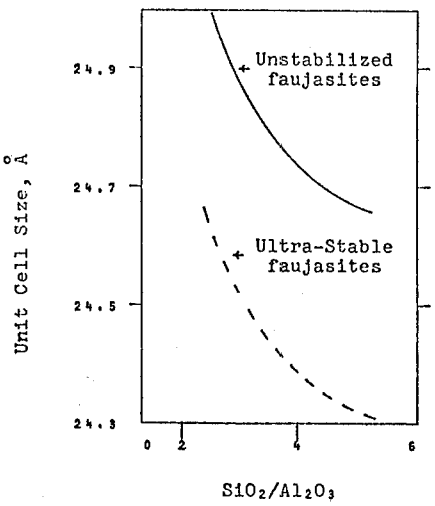

From the foregoing, it will be seen that faujasites defined as having a silica/alumina ratio above about 2.15, a unit cell size below about 24.65 A., and a sodium content below about 3 weight percent, calculated as $Na_2O$, are ultra-stable faujasites, and that the previously known unstabilized faujasites fall outside this defiintion. Accordingly, as used herein, the term "ultra-stable" is applied to various crystalline zeolitic molecular sieves means that the molecular sieves referred to have:

(a) a silica/alumina ratio above about 2.15;
(b) a unit cell size below about 24.65 A.; and
(c) a sodium content below about 3 weight percent, calculated as $Na_2O$.

It is known that various kinds of catalysts may be dried and calcined, for example at a temperature of 900°–1000° F. and then subjected to a further activation treatment (hereinafter called "thermactivation") at a higher temperature, to enchance various properties of the catalysts. Whether a thermactivation treatment will have any efficacy at all, and, if so, what the thermactivatioin temperautre should be, are functions of the particular catalyst composition involved, and the use to which it will be applied. These matters to a large extent are empirical. In the case of the catalysts of the present invention, it has been found that thermactivation in a particular temperautre range indeed does enhance various properties of the catalysts. The catalysts of the present invention contain ultra-stable crystalline zeolitic molecular sieves. Thermactivation of catalysts that are identical except that contain unstabilized crystalline zeolitic molecular sieves instead of ultra-stable crystalline zeolitic molecular sieves can enhance various properties of such catalysts, subject, however, to: (a) severe limitations on the extent to which the thermactivation temperatures can be elevated, because of the danger of at least partial structural collapse or dehydration of the molecular sieve components; (b) resulting proscription from thermactivation temperature levels at which various catalyst properties can be optimized.

OBJECTS

In view of the foregoing, objects of the present invention include providing an improved catalyst comprising a crystalline zeolitic molecular sieve component associated with other catalyst components that has, compared with similar prior art catalysts:

(1) improved hydrocracking activity;
(2) improved hydrodenitrification activity;
(3) improved high-temperature structural stability, with resulting improved amenability to high-temperature thermactivation.

Further objects of the present invention include provisions of hydrocracking and hydrofining processes, and combinations thereof, using said improved catalyst, that are capable of producing high yields of excellent-quality jet fuel and other valuable fuel products.

The present invention will best be understood, and further objects and advantages thereof will be apparent, from the following description when read in connection with the accompanying drawing.

DRAWING

In the drawing, FIG. 1 is a diagrammatic illustration of apparatus and flow paths suitable for carrying out the process of several of the embodiments of the present invention, wherein the catalyst of the present invention is used on a once-through basis to concurrently hydrocrack and hydrodenitrify a hydrocarbon feedstock to produce more valuable products, some of which may be further upgraded by catalytic reforming or catalytic hydrocracking, if desired.

Figure 2:
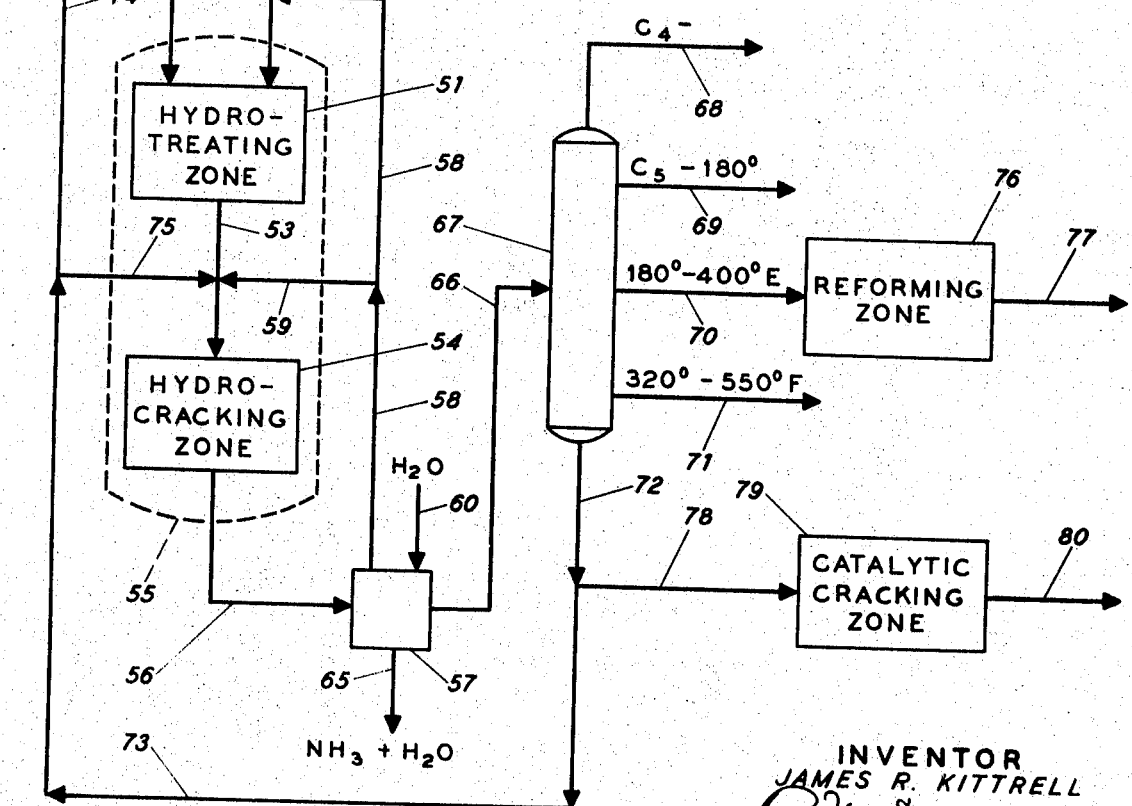

FIG. 2 is a diagrammatic illustration of apparatus and flow paths suitable for carrying out the process of additional embodiments of the present invention, wherein the catalyst of the present invention is used to concurrently hydrofine and hydrocrack a hydrocarbon feedstock, wherein the hydrofining-hydrocracking zone may be operated on a recycle basis, and wherein certain portions of the effluent from the hydrofining-hydrocracking zone may be catalytically reformed or catalytically cracked, as desired.

STATEMENT OF INVENTION

In accordance with the present invention, it has been found that the foregoing are achieved by a catalyst containing a unique combination of catalytic components in particular amounts, including silica, alumina, a Group VI component, a Group VIII component, and an ultra-stable crystalline zeolitic molecular sieve component that is substatially in the ammonia or hydrogen form and that is substantially free of any catalytic loading metal or metals. A Group IV component may be present, if desired.

Said ultra-stable crystalline zeolitic molecular sieve component preferably is a X type or Y type faujasite, modified to an ultra-stable form, as defined herein.

More particularly, in accordance with the present invention there is provided a catalyst composite comprising:

(A) A gel matrix comprising:

(a) at least 15 weight percent silica,
(b) alumina, in an amount providing an alumina-to-silica weight ratio of 15/85 to 80/20,
(c) nickel or cobalt, or the combination thereof, in the form of metal, oxide, sulfide or any combination thereof, in an amount of 1 to 10 weight percent, preferably 5 to 9 weight percent, of said matrix calculated as metal,
(d) molybdenum or tungsten, or the combination thereof, in the form of metal, oxide, sulfide or any combination thereof, in an amount of 5 to 25 weight percent, preferably 10 to 20 weight percent, of said matrix, calculated as metal, (B) A crystalline zeolitic molecular sieve substantially in the ammonia or hydrogen form, substantially free of any catalytic loading metal or metals, said sieve further having a silica/alumina ratio above 2.15, a unit cell size below about 24.65 angstroms and a sodium content below about 3 weight percent, calculated as $Na_2O$, said sieve further being in particualte form and being dispersed through said matrix; said catalyst composite being further characterized by an average pore diameter below 100 angstroms and a surface area above 200 square meters per gram.

Preferably said gel matrix comprises nickel and tungsten, in the form of the metals, oxides, sulfides or any combination thereof. It may also comprise titanium, zirconium, thorium or hafnium or any combination thereof, in the form of metal, oxide, sulfide or any combination thereof, in an amount of 1 to 10 weight percent, preferably 5 to 9 weight percent, of said matrix, calculated as metal, with titanium or a compound thereof being preferred. Said molecular sieve may be present in an amount of 1 to 40 weight percent of said composite.

Still further in accodrance with the present invention, there is provided a catalyst consisting essentially of:

(A) A porous Xerogel comprising:

(a) at least 15 weight percent silica,
(b) alumina, in an amount providing an alumina-to-silica weight ratio of 15/85 to 80/20,
(c) nickel, in the form of metal, oxide, sulfide or any combination thereof, in an amount of 1 to 10 weight percent, preferably 5 to 9 weight percent, of said Xerogel, calculated as metal,
(d) tungsten, in the form of metal, oxide, sulfide or any combination thereof, in an amount of 5 to 25 weight percent, preferably 10 to 20 weight percent, of said Xerogel, calculated as metal;

(B) A crystalline zeolitic molecular sieve, in an amount of 1 to 40 weight percent of said catalyst, said sieve being substantially in the ammonia or hydrogen form, and being substantially free of any catalytic loading metal or metals, said sieve further having a silica/alumina ratio above about 2.15, a unit cell size below about 24.65 angstroms and a sodium content below about 3 weight percent, calculated as $Na_2O$, said sieve further being in the form of particles, said particles being dispersed through said Xerogel; said catalyst having an average pore diameter below 100 angstroms and a surface area above 200 square meters per gram.

Still further in accordance with the present invention, it has been found that the aforesaid catalysts containing an ultra-stable molecular sieve component, either with or without a Group IV component, can be even further improved in various respects by a novel heat treatment procedure, which serves both to activate and stabilize the catalyst. Said heat treatment procedure, hereinafter for convenience called an activation or thermactivation treatment or procedure, is applied to the total catalyst composite, following dispersion of the crystalline zeolitic molecular sieve component in the gel matrix.

In accordance with said thermactivation procedure, the aforesaid catalysts containing an ultra-stable molecular sieve component are thermactivated in an oxygen-containing gas stream at temperatures in the range 1200° to 1600° F., preferably 1250° to 1400° F., for 0.25 to 48 hours. The oxygen-containing gas stream, which may be air, preferably is as dry as practicable. The improved results obtainable with said thermactivation procedure are optimized as the gas stream becomes extremely dry;

although for most practical purposes the gas stream need be only as dry as ambient air, greater dryness is preferred. Those skilled in the art will be aware of various methods for drying the gas stream to any desired extent.

Although said thermactivation procedure is applicable to activation of catalysts of the aforesaid type with a wide range of silica content, it is especially useful with such catalysts that contain less than 40 weight percent silica in the total catalyst, and less than 35 weight percent silica in the catalyst matrix.

Further in accordance with the present invention there is provided the method of activating a catalyst composite comprising:

(A) A gel matrix comprising:
(a) at least 15 weight percent silica,
(b) alumina, in an amount providing an alumina-to-silica weight ratio of 15/85 to 80/20,
(c) nickel or cobalt, or the combination thereof, in the form of metal, oxide, sulfide or any combination thereof, in an amount of 1 to 10 weight percent of said matrix, calculated as metal,
(d) molybdenum or tungsten, or the combination thereof, in the form of metal, oxide, sulfide or any combination thereof, in an amount of 5 to 25 weight percent of said matrix, calculated as metal;

(B) A crystalline zeolitic molecular sieve substantially in the ammonia or hydrogen form, substantially free of any catalytic loading metal or metals, said sieve further having a silica/alumina ratio above about 2.15, a unit cell size below about 24.65 angstroms and a sodium content below about 3 weight percent, calculated as $Na_2O$, said sieve further being in particulate form and being dispersed through said matrix; said catalyst composite being further characterized by an average pore diameter below 100 angstroms and a surface area above 200 square meters per gram; which method comprises heating said catalyst composite in an oxygen-containing gas stream at temperatures in the range 1200° to 1600° F. for 0.25 to 48 hours.

Further in accordance with the present invention there is provided a catalyst composite comprising:

(A) A gel matrix comprising:
(a) at least 15 weight percent silica,
(b) alumina, in an amount providing an alumina-to-silica weight ratio of 15/85 to 80/20,
(c) nickel or cobalt, or the combination thereof, in the form of metal, oxide, sulfide or any combination thereof, in an amount of 1 to 10 weight percent of said matrix, calculated as metal,
(d) molybdenum or tungsten, or the combination thereof, in the form of metal, oxide, sulfide or any combination thereof, in an amount of 5 to 25 weight percent of said matrix, calculated as metal;

(B) A crystalline zeolitic molecular sieve substantially free of any catalytic loading metal or metals, said sieve further having a silica/alumina ratio above about 2.15, a unit cell size below about 24.65 angstroms and a sodium content below about 3 weight percent, calculated as $Na_2O$, said sieve further being in particulate form and being dispersed through said matrix; said catalyst composite further being characterized by an average pore diameter below 100 angstroms and a surface area above 200 square meters per gram; said catalyst composite being further characterized by hydrocracking activities and stabilities developed therein by heating said catalyst composite in an oxygen-containing gas stream at temperatures in the range 1200° to 1600° F. for 0.25 to 48 hours.

The gel matrix of the aforesaid catalyst composite additionally may comprise titanium, zirconium, thorium, hafnium, or any combination thereof, in an amount of 1 to 10 weight percent, preferably 5 to 9 weight percent, of said matrix, calculated as metal.

Further in accordance with the present invention it has been found that the catalysts of the present invention, containing ultra-stable crystalline zeolitic molecular sieves, are unique in that following drying and calcination thereof, or following drying and thermactivation thereof if said catalysts are subjected to the thermactivation procedure described herein, they are amenable to a marked activity increase by the addition of water thereto. It has been found that the drying and calcination, or drying and thermactivation procedures dehydrate the ultrastable crystalline zeolitic molecular sieve components of the catalysts, which require rehydration at least in part of optimize the activities of these components. It has been found that said activities are optimized if rehydration is accomplished after the calcination or thermactivation step, to the extent that at least 0.1, preferably 0.1 to 1.0, ml. of water per gram of ultra-stable crystalline zeolitic molecular sieve component is combined with the total catalyst. Accordingly, in accordance with preferred embodiments of the present invention, said catalysts, following calcination or thermactivation thereof, are rehydrated by combining with them at least 0.1, preferably 0.1 to 1.0 ml. of water per gram of ultra-stable crystalline zeolitic molecular sieve component contained therein. Even more preferably, said catalysts are maintained in said rehydrated state during at least the major portions of the on-stream periods while being used in the process of the present invention.

Still further in accordance with the present invention, there is provided a hydrotreating process which comprises contacting a hydrocarbon feed containing substantial amounts of materials boiling above 200° F., and selected from the group consisting of petroleum distillates, solvent-deasphalted petroleum residua, shale oils and coal tar distillates, in a reaction zone with hydrogen and the catalyst described above, at hydrotreating conditions including a temperature in the range 400° to 950° F., a pressure in the range 800 to 3500 p.s.i.g., a liquid hourly space velocity in the range 0.1 to 5.0 and a total hydrogen supply rate of 200 to 20,000 s.c.f. of hydrogen per barrel of feedstock, and recovering hydrotreated products from said reaction zone. The hydrocarbon feed may contain a substantial amount of organic nitrogen, because the catalyst of the present invention is extremely tolerant of organic nitrogen as well as of ammonia, and because the catalyst is an efficient hydrodenitrification catalyst. The catalyst will accomplish hydrodenitrification and hydrocracking concurrently and efficiently. The catalyst may be used as a hydrodenitrification catalyst in a zone preceding a hydrocracking zone containing a similar or different hydrocracking catalyst. A superior jet fuel product may be produced when the catalyst is used for hydrocracking a suitable feedstock. A superior feedstock for a catalytic reformer also may be produced when the catalyst is used for hydrocracking. The hydrocracking zone effluent boiling above the gasoline boiling range, or boiling above the jet fuel boiling range when a jet fuel product is being recovered, may be catalytically cracked to produce additional valuable products.

The reference herein to a crystalline zeolitic molecular sieve "substantially free of any catalytic loading metal or metals" means that the molecular sieve contains no more than 0.5 weight percent of catalytic metal or metals, based on the sieve. The catalytic metal or metals include the Group IV, VI and VIII metals, excluding sodium.

It will be noted that the weight ratio of catalytic metal in the non-molecular sieve portion of the catalyst to catalytic metal in the molecular sieve portion of the catalyst is high. Certain prior art catalysts achieve a low catalytic metal loading of the molecular sieve component only with a concurrent very low metal content of the non-molecular sieve portion of the catalyst, and it has been found that such catalysts are inferior to the catalyst of the present invention.

HYDROCARBON FEEDSTOCKS

The feedstocks supplied to the hydrofining-hydrocracking zone in the process of the present invention are selected from the group consisting of petroleum distillates, solvent-deasphalted petroleum residua, shale oils and coal tar distillates. The feedstocks contain substantial amounts of materials boiling above 200° F., preferably substantial amounts of materials boiling in the range 350° to 950° F., and more preferably in the range 400° to 900° F. Suitable feedstocks include those heavy distillates normally defined as heavy straight-run gas oils and heavy cracked cycle oils, as well as conventional FCC feed and portions thereof. Cracked stocks may be obtained from thermal or catalytic cracking of various stocks, including those obtained from petroleum, gilsonite, shale and coal tar. Because of the superior hydrofining activity and stability of the catalyst of the present invention, the feedstocks need not be subjected to a prior hydrofining treatment before being used in the hydrofining-hydrocracking process of the present invention. Feedstocks may contain as high as several thousand parts per million organic nitrogen, although preferably the organic nitrogen content will be less than 1000 parts per million organic nitrogen. Feedstocks also may contain several weight percent organic sulfur.

CATALYST COMPRISING AN ULTRA-STABLE CRYSTALLINE ZEOLITIC MOLECULAR SIEVE COMPONENT AND PREPARATION THEREOF

(A) General

The ultra-stable crystalline zeolitic molecular sieve component of the hydrofining-hydrocracking catalyst may be an ultra-stable modification of any type of crystalline zeolitic molecular sieve that is known in the art as a useful component of a conventional hydrocracking catalyst containing a crystalline zeolitic molecular sieve component. A decationized molecular sieve cracking component is preferred. Especially suitable are ultra-stable faujasite, particularly ultra-stable Y type and X type faujasite, and ultra-stable mordenite, in the ammonia form or hydrogen form.

(B) Method of preparation

The molecular sieve component of the catalyst, prior to being converted to an ultra-stable form, may be prepared by any conventional method known in the art. The molecular sieve component so prepared may be converted to the ultra-stable form by the methods set forth in said McDaniel and Maher paper.

The ultra-stable molecular sieve component may be dispersed in a matrix of the other catalyst components by cogelation of said other components around said ultra-stable molecular sieve component in a conventional manner.

The ultra-stable molecular sieve component, substantially in the ammonia or hydrogen form, may be maintained substantially free of any catalytic loading metal or metals, as required by the present invention, by dispersing the molecular sieve component in a slurry of the precursors of the other catalyst components at a pH of 5 or above.

The finished catalyst may be sulfided in a conventional manner prior to use, if desired. If not presulfided, the catalyst will tend to become sulfided during process operation from any sulfur content that may be present in the hydrocarbon feed.

OPERATING CONDITIONS

The hydrofining-hydrocracking zone containing the catalyst of the present invention is operated at a temperature in the range 400° to 950° F., preferably 500° to 850° F., a pressure in the range 800 to 3500 p.s.i.g., preferably 1000 to 3000 p.s.i.g., a liquid hourly space velocity in the range 0.1 to 5.0, preferably 0.5 to 5.0, and more preferably 0.5 to 3.0. The total hydrogen supply rate (makeup and recycle hydrogen) to said zone is 200 to 20,000 s.c.f., preferably 2000 to 20,000 s.c.f. of hydrogen per barrel of hydrocarbon feedstock.

The operating conditions in the reforming zone and catalytic cracking zone employed in various embodiments of the present invention are conventional conditions known in the art.

PROCESS OPERATION WITH REFERENCE TO DRAWINGS

Referring now to FIG. 1 of the drawing, in accordance with one embodiment of the present invention, a hydrocarbon feedstock as previously described, which in this case may boil above 400° F. and which may contain a substantial amount of organic nitrogen compounds, is passed through line 1 into hydrofining-hydrocracking zone 2, which contains the catalyst of the present invention. The feedstock is hydrocracked in hydrocracking zone 2 at conditions previously described in the presence of hydrogen supplied through line 3. Under these conditions, concurrent hydrodenitrification takes place to the extent that the feedstock is substantially denitrified. The effluent from zone 2 is passed through line 4 to separation zone 5, from which hydrogen separated from the treated feedstock is recycled through line 6 to zone 2. In zone 5, water entering through line 7 is used to scrub ammonia and other contaminants from the incoming hydrocarbon stream, and the ammonia, water and other contaminants are withdrawn from zone 5 through line 8. From zone 5, the scrubbed, hydrocracked materials are passed through line 9 to distillation column 10, where they are separated into fractions, including a $C_4^-$ fraction which is withdrawn through line 15, a $C_5$–180° F. fraction which is withdrawn through line 16, a 180°–400° F. fraction which is withdrawn through line 17, a 320°–550° F. fraction which is withdrawn through line 18, and a 320° F.+ fraction which is withdrawn through line 19. The $C_5$–180° F. fraction withdrawn through line 16 is a superior-quality light gasoline. The 180°–400° F. fraction withdrawn through line 17 is a superior catalytic reforming feedstock, which may be catalytically reformed in reforming zone 20, from which a superior catalytic reformate may be withdrawn through line 25. The 320°–550° F. fraction withdrawn through line 18 is a superior-quality jet fuel. The 320° F.+ fraction withdrawn through line 19 is a superior hydrocracking feedstock, which may be catalytically hydrocracked in hydrocracking zone 26 in the presence of a conventional hydrocracking catalyst and in the presence of hydrogen supplied to zone 26 through line 27. From hydrocracking zone 26, an effluent may be withdrawn through line 28, hydrogen may be separated therefrom in separator 29, and hydrogen may be recycled to hydrocracking zone 26 through line 30. Alternatively, said 320° F.+ fraction may be catalytically cracked in a catalytic cracking zone under conventional catalytic cracking conditions. From separator 29, hydrocracked materials may be passed through lines 35 and 9 to distillation column 10, where they may be separated into fractions, as previously described.

Referring now to FIG. 2, a hydrocarbon feedstock as previously described, which in this case may boil above 400° F., and which may contain substantial amounts of organic nitrogen compounds, is passed through line 50 to hydrofining-hydrocracking zone 51, containing the catalyst of the present invention. The feedsotck is concurrently hydrofined and hydrocracked in zone 51 at conditions previously described in the presence of hydrogen supplied through line 52. The effluent from zone 51 may be passed through line 53 into hydrocracking zone 54, where it may be hydrocracked under the same conditions as used in zone 51, in the presence of a hydrocracking catalyst. The hydrocracking catalyst in zone 54 may be the same catalyst as used in zone 51, or may be a conventional hydrocracking catalyst comprising a crystalline zeolitic molecular sieve cracking component, in either of which cases the effluent from zone 51 may be passed through line 53 into zone 54 without intervening impurity removal. If the hydrocracking catalyst in zone 54 does not contain a crystalline zeolitic molecular sieve component, it is preferred that interstage removal of ammonia and other impurities be accomplished between zones 51 and 54. Zones 51 and 54 may be located in separate reactor shells, which may be operated at different pressures. Alternatively, zones 51 and 54 may be separate catalyst beds located in a single pressure shell 55, and the effluent from zone 51 may be passed to zone 54 without intervening pressure letdown, condensation or impurity removal, particularly in the case where zone 54 contains the catalyst of the present invention or a conventional catalyst comprising a crystalline zeolitic molecular sieve component. The effluent from zone 54 is passed through line 56 to separation zone 57, from which hydrogen is recycled through line 58 to hydrofining-hydrocracking zone 51. All or a portion of the recycled hydrogen may be passed through line 59 to hydrocracking zone 54, if desired. In separation zone 57, water entering through line 60 is used to scrub ammonia and other contaminants from the incoming hydrocarbon stream, if these contaminants previously have not been removed between zones 51 and 54, and the ammonia, water and other contaminants are withdrawn from zone 57 through line 65. The effluent from zone 57 is passed through line 66 to distillation column 67, where it is separated into fractions, including a $C_4^-$ fraction which is withdrawn through line 68, a $C_5$–180° F. fraction which is withdrawn through line 69, a 180°–400° F. fraction which is withdrawn through line 70, a 320°–550° F. fraction which is withdrawn through line 71, and a 320° F.+ fraction which is withdrawn through line 72. The fraction withdrawn through line 72 may be recycled through lines 73 and 74 to hydrofining-hydrocracking zone 51, and this is a preferred manner of operation. All or a portion of the fraction in line 73 may be recycled to hydrocracking zone 54 through line 75, if desired. The $C_5$–180° F. fraction withdrawn through line 69 is a superior-quality light gasoline. The 180°–400° F. fraction withdrawn through line 70 is a superior catalytic reforming feedstock, which may be catalytically reformed in reforming zone 76, from which a superior catalytic reformate may be withdrawn through line 77. The 320°–550° F. fraction withdrawn through line 71 is a superior-quality jet fuel. All or a portion of the 320° F.+ fraction withdrawn through line 72 may be passed through line 78 to catalytic cracking zone 79, where it may be catalytically cracked under conventional catalytic cracking conditions in the presence of a conventional catalytic cracking catalyst to produce valuable fuel products, which may be withdrawn from zone 79 through line 80.

EXAMPLES

The following examples are given for the purpose of further illustrating the catalyst of the present invention, the preparation thereof, and the use thereof in the process of the present invention. The examples are not intended to limit the scope of the present invention.

Example 1

A cogelled catalyst (Catalyst A) of the following composition is prepared:

| Component: | Wt. percent of total catalyst |
|---|---|
| NiO | 10.0 |
| WO₃ | 24.5 |
| Al₂O₃ | 29.0 |
| SiO₂ | 25.5 |
| Ultra-stable crystalline zeolitic molecular sieve, 'Y' form | 11.0 |
| Total | 100.0 |

The catalyst is prepared by the following steps, using sufficient quantities of the various starting materials to produce the above-indicated weight percentages of the components of the final catalyst:

(1) An aqueous acidic solution is prepared, containing $AlCl_3$, $NiCl_2$ and acetic acid.

(2) Three alkaline solutions are prepared: (1) a sodium silicate solution; (2) a sodium tungstate solution; and (3) an ammonia solution containing sufficient excess ammonia so that upon combining the alkaline solutions with the acidic solution coprecipitation of all of the metal-containing components of the solutions will occur at a neutral pH of about 7.

(3) The acidic and alkaline solutions are combined, and coprecipitation of all of the metal-containing components of the solutions occurs at a pH of about 7, resulting in a slurry, (4) An ultra-stable ammonium Y crystalline zeolitic molecular sieve in finely divided form is added to the slurry.

(5) The molecular sieve-containing slurry is filtered to produce a molecular sieve-containing hydrogel filter cake, which is washed repeatedly with dilute ammonium acetate solution, to further remove ionic impurities, including chlorides, from both the hydrogel and the molecular sieve contained therein.

(6) The molecular sieve-containing hydrogel is dried in an air-circulating oven and then is activated in flowing air for 5 hours at 950° F., and then is thermactivated in flowing air for 2 hours at 1250° F.

The finished catalyst is characterized by a surface area of about 400 m.²/g., a pore volume of about 0.4 cc./g., an average pore diameter of about 40 angstroms, and an ultra-stable molecular sieve component substantially free of catalytic metals; that is, substantially all of the nickel and tungsten contained in the catalyst is located in the gel portion of the catalyst rather than in the ultra-stable molecular sieve component thereof.

Example 2

A cogelled catalyst (Catalyst B) is prepared exactly as in Example 1, except that prior to incorporation in the slurry the ultra-stable molecular sieve is pre-soaked in an ammoniacal solution of $NiCl_2$, to load the molecular sieve with nickel. The amounts of starting materials are selected to provide a final catalyst containing the same weight percentages of components as the catalyst of Example 1.

The catalyst thus differs from the catalyst of Example 1 only in that the nickel contained therein is located both in the gel component and in the molecular sieve component.

Example 3

A cogelled catalyst (Catalyst C) is prepared exactly as in Example 1, except that no molecular sieve component is incorporated therein. The amounts of starting materials are selected to provide a final catalyst with the same proportions of non-molecular sieve components as the catalyst of Example 1. The composition of the final catalyst is:

| Component: | Weight percent of total catalyst |
|---|---|
| NiO | 11.2 |
| WO₃ | 27.5 |
| Al₂O₃ | 32.6 |
| SiO₂ | 28.7 |
| Total | 100.0 |

It will be noted that the weight percentage of each non-molecular sieve component of Catalysts A and B is 89% of the weight percentage of the same component of Catalyst C, the additional 11 weight percent of Catalysts A and B being contributed by the molecular sieve component.

Example 4

Portions of Catalysts A, B and C of Examples 1–3, respectively, are separately used to hydrocrack separate portions of a California gas-oil feedstock, on a once-through basis:

The gas-oil feedstock has the following characteristics:

| | |
|---|---|
| Boiling range, ° F. | 500–900 |
| Gravity, ° API | 19 |
| Organic nitrogen content, p.p.m. | 3000 |

The hydrocracking conditions were:

| | |
|---|---|
| Total pressure, p.s.i.g. | 2500 |
| Total hydrogen rate, s.c.f./bbl. | 10,000 |
| Liquid hourly space velocity, v./v./hr. | 0.8 |
| Per-pass conversion of products boiling below 550° F., vol. percent | 60 |

Starting temperature, ° F. as indicated below.

The hydrocracking activities of the three catalysts, as measured by the starting temperatures necessary to achieve the indicated per-pass conversion, are:

| Catalyst: | Starting T, ° F. |
|---|---|
| A | 725 |
| B | 750 |
| C | 775 |

The 300°–550° F. jet fuel boiling range product in each case is of the same adequate quality, in that in each case the smoke point is 21 mm. and the freeze point is below −94° F.

The hydrocracked liquid product in each case is essentially free of organic nitrogen compounds, indicating that essentially complete hydrodenitrification accompanies the hydrocracking in each case.

From this example, it appears that: (1) the molecular sieve-containing gel catalysts (Catalysts A and B) have hydrocracking activity superior to that of a catalyst (Catalyst C) that does not contain a molecular sieve component but that is otherwise identical; (2) the gel catalyst containing a non-metal-loaded molecular sieve component (Catalyst A) has hydrocracking activity superior to that of a gel catalyst that is identical except that contains a molecular sieve component that is metal loaded (Catalyst B); and (3) the gel catalyst containing a non-metal-loaded molecular sieve component (Catalyst A) accomplishes essentially complete hydrodenitrification at a substantially lower temperature than Catalysts B and C.

Example 5

Another portion of Catalyst A of Example 1 is used to hydrocrack a solvent-deasphalted hydrocarbon oil boiling above 550° F. and containing 5500 p.p.m. organic nitrogen, on a once-through basis. Thereupon, said portion of Catalyst A is used to hydrocrack another portion of the same solvent-deasphalted oil, with extinction recycle of products boiling above 550° F.

The hydrocracking conditions, after operating equilibrium is reached, are:

| | Catalyst A once-through | Catalyst A recycle |
|---|---|---|
| Temperature, ° F. | 800 | 800 |
| Total pressure, p.s.i.g. | 2,500 | 2,500 |
| Total exist gas rate | 10,000 | 10,000 |
| Liquid hourly space velocity, v./v./hr. | 0.8 | 0.8 |
| Conversion to 550° F.−, vol. percent | 40 | 75 |
| 300°–550° F. jet fuel product fraction: | | |
| Yield, vol. percent | 30.0 | 51.0 |
| Smoke point, mm. | 20 | 30.0 |
| Freeze point, ° F. | −65 | −70 |
| Paraffins, vol. percent | 17.0 | 37.0 |
| Naphthenes, vol. percent | 68.0 | 54.0 |
| Aromatics, vol. percent | 15.0 | 9.0 |

From this example, it appears that a high yield of excellent-quality jet fuel is obtained from the solvent-deasphalted hydrocarbon oil feed, in both once-through and recycle operation. It also appears that the recycle operation results in superior hydrocracking activity, jet fuel yield and jet fuel quality, attributable to cracking to extinction into the jet fuel range of the normal paraffins concentrated in the high-boiling portion of the SDA oil.

Example 6

The 550° F.+ product from the once-through operation in Example 9 is further processed in a subsequent hydrocracking or catalytic cracking stage. This product is a superior, upgraded feedstock for such subsequent processing.

Example 7

A cogelled catalyst (Catalyst D) of the following composition is prepared:

| Component: | Wt. percent of total catalyst |
|---|---|
| NiO | 8.2 |
| $WO_3$ | 18.2 |
| $TiO_2$ | 5.6 |
| $Al_2O_3$ | 24.0 |
| $SiO_2$ | 24.0 |
| Ultra-stable crystalline zeolitic molecular sieve, 'Y' form | 20.0 |
| Total | 100.0 |

The catalyst is prepared by the following steps, using sufficient quantites of the various starting materials to produce the above-indicated weight percentages of the components of the final catalyst:

(1) An aqueous acidic solution is prepared, containing $AlCl_3$, $TiCl_4$, $NiCl_2$ and acetic acid.

(2) Three alkaline solutions are prepared: (1) a sodium silicate solutions; (2) a sodium tungstate solution; and (3) an ammonia solution containing sufficient excess ammonia so that upon combining the alkaline solutions with the acidic solution coprecipitation of all of the metal-containing components will occur at a neutral pH of about 7.

(3) The acidic and alkaline solutions are combined, and coprecipitation of all of the metal-containing components of those solutions occurs at a pH of about 7, resulting in a slurry.

(4) An ultra-stable ammonium Y crystalline zeolitc molecular sieve in finely divided form is added to the slurry.

(5) The molecular sieve-containing slurry is filtered to produce a molecular sieve-containing hydrogel filter cake, which is washed repeatedly with dilute ammonium acetate solution to further remove ionic impurities, including chloride, from both the hydrogel and the molecular sieve contained therein.

(6) The molecular sieve-containing hydrogel is dried in an air-circulating oven and then is activated in flowing air at 950° F. for 5 hours.

The finished catalyst is characterized by a surface area of about 400 m.²/g., a pore volume of about 0.4 cc./g., an average pore diameter of about 40 angstroms, and an ultra-stable molecular sieve component substantially free of catalytic metals; that is, substantially all of the nickel, tungsten and titanium in the catalyst is located in the gell portion of the catalyst rather than in the ultra-stable molecular sieve component thereof.

Example 8

A cogelled catalyst (Catalyst E), of exactly the same composition as Cataylst D of Example 7, is prepared. The catalyst is prepared in exactly the same manner as Catalyst D of Example 7 except that upon completion of the activation at 950° F. for 5 hours the catalyst is further activated at 2175° F. for 2 hours.

The finished catalyst is characterized by a surface area of about 350 m.²/g., a pore volume of about 0.4 cc./g., an average pore diameter of about 40 angstroms. The ultra-stable molecular sieve component remains substantially free of catalystic metals.

Example 9

A cogelled catalyst (Catalyst F, a comparison catalyst) is prepared. The catalyst has the same composition as Catalyst D of Example 7 except that it contains only 10 weight percent of ultra-stable crystalline zeolitic molecular sieve and the weight percentages of the other components are proportionally higher. Catalyst F is prepared in exactly the same manner as a Catalyst D of Example 7, including a final activation treatment in flowing air at 950° F. for 5 hours.

Example 10

A cogelled catalyst (Catalyst G) of the following composition is prepared:

| Component: | Wt. percent of total catalyst |
|---|---|
| NiO | 11.4 |
| $WO_3$ | 11.3 |
| $ZrO_2$ | 9.0 |
| $Al_2O_3$ | 27.0 |
| $SiO_2$ | 31.3 |
| Ultra-stable crystalline zeolitic molecular sieve, Y form | 10.0 |
| Total | 100.0 |

The catalyst is prepared in exactly the same manner as Catalyst D of Example 7, except that $ZrOCl_2$ is used instead of $TiCl_4$. The final activation treatment, as in the case of Catalyst D of Example 7, is in flowing air at 950° F. for 5 hours.

The finished catalyst is characterized by a surface area of 420 m.²/g., a pore volume of 0.347, an average pore diameter of 33 angstroms, and an ultra-stable molecular sieve component substantially free of catalytic metals; that is, substantially all of the nickel, tungsten and zirconium in the catalyst is located in the gel portion of the catalyst rather than in the ultra-stable molecular sieve component thereof.

Example 11

A cogelled catalyst (Catalyst H), of exactly the same composition as Catalyst G of Example 10, is prepared. The catalyst is prepared in exactly the same manner as Catalyst G of Example 10, except that upon completion of the activation at 950° F. for 5 hours the catalyst is further activated at 1350° F. for 2 hours.

The finished catalyst is characterized by a surface area of 374 m.²/g., a pore volume of 0.353, and an average pore diameter of 38 angstroms. The ultra-stable molecular sieve component remains substantially free of catalytic metals.

Example 12

Catalysts D and F of Examples 7 and 9, respectively, are separately used to hydrocrack separate portions of a light cycle oil of the following description:

| | |
|---|---|
| Gravity, ° API | 19.5 |
| Aniline point, ° F. | 62 |
| Sulfur content, wt. percent | 0.43 |
| Nitrogen content, p.p.m. | 330 |
| ASTM D–1160 distillation: | |
| ST/5 | 381/471 |
| 10/30 | 492/532 |
| 50 | 568 |
| 70/90 | 598/635 |
| 95/EP | 648/681 |

The hydrocracking is accomplished at the following conditions:

| | |
|---|---|
| Hydrogen pressure, p.s.i.g. | 1100 |
| Per-pass conversion to products boiling below 400° F., vol. percent | 80 |
| Liquid hourly space velocity, v./v./hr. | 0.9 |
| Starting temperature, as indicated below. | |

The hydrocracking is accomplished on a recycle basis, that is, with recycle to the hydrocracking zone from the effluent thereof materials boiling above 400° F.

The hydrocracking activities of the two catalysts, as measured by the operating temperatures necessary to achieve the indicated per-pass conversion, and the fouling rates of the two catalysts, as indicated by the hourly rise in temperature necessary to maintain the indicated per-pass conversion, are:

| | Catalyst D | Catalyst F |
|---|---|---|
| Operating temperature, ° F | 725 | 725 |
| Fouling rate, ° F./hr | 0.07 | 0.03 |

From the foregoing, it may be seen that Catalyst D is as active as comparison Catalyst F, but that it has poor stability compared with Catalyst F.

Example 13

Catalysts E and F of Examples 8 and 9, respectively, are separately used to hydrocrack separate portions of a gas oil of the following description:

| | |
|---|---|
| Gravity, ° API | 29.0 |
| Aniline point, ° F. | 165 |
| Sulfur content, wt. percent | 1.9 |
| Nitrogen content, p.p.m. | 390 |
| ASTM D–1160 distillation: | |
| ST/5 | 486/551 |
| 10/30 | 577/629 |
| 50 | 674 |
| 70/90 | 716/791 |
| 95/EP | 825/948 |

The hydrocracking is accomplished at the following conditions:

| | |
|---|---|
| Hydrogen pressure, p.s.i.g. | 1300 |
| Per-pass conversion to products boiling below 550° F., vol. percent | 70 |
| Liquid hourly space velocity, v./v./hr. | 1.5 |
| Starting temperature, as indicated below. | |

The hydrocracking is accomplished on a recycle basis, that is, with recycle to the hydrocracking zone from the effluent thereof materials boiling above 550° F.

The hydrocracking activities of the two catalysts, as measured by the operating temperatures necessary to achieve the indicated per-pass conversion, and the fouling rates of the two catalysts, as indicated by the hourly rise in temperature necessary to maintain the indicated per-pass conversion, are:

| | Catalyst E | Catalyst F |
|---|---|---|
| Operating temperature, ° F | 705 | 706 |
| Fouling rate, ° F./hr | 0.02 | 0.02 |

From the foregoing, it may be seen that Catalyst E has essentially the same activity and the same stability as comparison Catalyst F. Accordingly, the heat treatment activation of Catalyst D at 1275° F. for 2 hours results in a catalyst, Catalyst E, having a stability markedly better than that of Catalyst D, and this is achieved without harm to the activity of the catalyst.

Example 14

Catalysts G and H of Examples 10 and 11, respectively, are separately used to hydrocrack separate portions of a hydrofined Mid-Continent straight-run gas oil of the following description:

| | |
|---|---|
| Gravity, ° API | 31.5 |
| Aniline point, ° F. | 172 |
| Nitrogen content, p.p.m. | 0.44 |
| Boiling range, ° F. | 400–800 |

The hydrocracking is accomplished at the following conditions:

| | |
|---|---|
| Temperature, ° F. | 570 |
| Liquid hourly space velocity, v./v./hr. | 2 |
| Total pressure, p.s.i.g. | 1,200 |
| Total gas rate, s.c.f./bbl. | 12,000 |

After 98 hours on stream, the activity indices of the two catalysts are determined. In each case, the activity index is defined as the difference between the API gravity of the liquid product and the API gravity of the liquid feed. The results are:

Activity index:
Catalyst G _____ 14.9
Catalyst H _____ 20.2

From the foregoing, it may be seen that Catalyst H had a greater hydrocracking activity than Catalyst G. Accordingly, the heat treatment activation of Catalyst G at 1350° F. for 2 hours resulted in a catalyst, Catalyst H, having an activity index markedly better than that of Catalyst G.

CONCLUSIONS

Applicant does not intend to be bound by any theory for the unexpectedly superior hydrofining and hydrocracking activities and stabilities, and structural thermal stabilities, of the catalysts of the present invention. He assumes that the favorable results are largely attributable to, and unique to, the particular combination of catalytic components used, including an ultra-stable molecular sieve component coupled with a relatively high ratio of catalytic metals in the non-molecular sieve portion of the catalyst compared with the catalytic metals in the molecular sieve portion of the catalyst, further coupled with the low absolute amount of catalytic metals in the molecular sieve portion of the catalyst, in further combination in specific embodiments with a thermactivation treatment, which is facilitated by the presence of the ultra-stable molecular sieve compenent.

Although only specific embodiments of the present invention have been described, numerous variations can be made in these embodiments without departing from the spirit of the invention, and all such variations that fall within the scope of the appended claims are intended to be embraced thereby.

What is claimed is:
1. A catalyst composite comprising:
   (A) A gel matrix comprising:
      (a) at least 15 weight percent silica,
      b) alumina, in an amount providing an alumina-to-silica weight ratio of 15/85 to 80/20,
      (c) nickel or cobalt, or the combination thereof, in the form of metal, oxide, sulfide or any combination thereof, in an amount of 1 to 10 weight percent of said matrix, calculated as metal,
      (d) molybdenum or tungsten, or the combination thereof, in the form of metal, oxide, sulfide or any combination thereof, in an amount of 5 to 25 weight percent of said matrix, calculated as metal;
   (B) A crystalline zeolitic molecular sieve substantially in the ammonia or hydrogen form, substantially free of any catalytic loading metal or metals, said sieve further having a silica/alumina ratio above about 2.15, a unit cell size below about 24.65 angstroms and a sodium content below about 3 weight percent, calculated as $Na_2O$, said sieve further being in particulate form and being dispersed through said matrix; said catalyst composite being further characterized by an average pore diameter below 100 angstroms and a surface area above 200 square meters per gram.
2. A catalyst composite as in claim 1, wherein said gel matrix comprises nickel and tungsten, in the form of the metals, oxides, sulfides or any combination thereof.
3. A catalyst composite as in claim 1, wherein said gel matrix further comprises titanium, zirconium, thorium or hafnium or any combination thereof, in the form of the metal, oxide, sulfide or any combination thereof, in an amount of 1 to 10 weight percent of said matrix, calculated as metal.
4. A catalyst composite as in claim 1, wherein said molecular sieve is a faujasite, modified as necessary to have the indicated characteristics.
5. A catalyst composite as in claim 1, wherein said crystalline zeolitic molecular sieve is present in an amount of 1 to 40 weight percent of said composite.
6. A catalyst composite as in claim 1, containing at least 0.1 ml. $H_2O$ per gram of said molecular sieve.
7. A catalyst consisting essentially of:
   (A) A porous Xerogel comprising:
      (a) at least 15 weight percent silica,
      (b) alumina, in an amount providing an alumina-to-silica weight ratio of 15/85 to 80/20,
      (c) nickel, in the form of metal, oxide, sulfide or any combination thereof, in an amount of 1 to 10 weight percent of said Xerogel, calculated as metal,
      (d) tungsten, in the form of metal, oxide, sulfide or any combination thereof, in an amount of 5 to 25 weight percent of said Xerogel, calculated as metal;
   (B) A crystalline zeolitic molecular sieve, in an amount of 1 to 40 weight percent of said catalyst, said sieve being substantially in the ammonia or hydrogen form, and being substantially free of any catalytic loading metal or metals, said sieve further having a silica/alumina ratio above about 2.15, a unit cell size below about 24.65 angstroms and a sodium content below about 3 weight percent, calculated as $Na_2O$, said sieve further being in the form of particles, said particles being dispersed through said Xerogel; said catalyst having an average pore diameter below 100 angstroms and a surface area above 200 square meters per gram.
8. The method of activating a catalyst composite comprising:
   (A) A gel matrix comprising:
      (a) at least 15 weight percent silica,
      (b) alumina, in an amount providing an alumina-to-silica weight ratio of 15/85 to 80/20,
      (c) nickel or cobalt, or the combination thereof, in the form of metal, oxide, sulfide or any combination thereof, in an amount of 1 to 10 weight percent of said matrix, calculated as metal,
      (d) molybdenum or tungsten, or the combination thereof, in the form of metal, oxide, sulfide or any combination thereof, in an amount of 5 to 25 weight percent of said matrix, calculated as metal;
   (B) A crystalline zeolitic molecular sieve substantially in the ammonia or hydrogen form, substantially free of any catalytic loading metal or metals, said sieve further having a silica/alumina ratio above about 2.15, a unit cell size below about 24.65 angstroms and a sodium content below about 3 weight percent, calculated as $Na_2O$, said sieve further being in particulate form and being dispersed through said matrix; said catalyst composite being further characterized by an average pore diameter below 100 angstroms and a surface area above 200 square meters per gram; which method comprises heating said catalyst composite in an oxygen-containing gas stream at temperatures in the range 1200° to 1600° F. for 0.25 to 48 hours.
9. The method as in claim 8, with the addition to said catalyst composite following said heating of at least 0.1 ml. $H_2O$ per gram of said molecular sieve.
10. A catalyst composite comprising:
   (A) A gel matrix comprising:
      (a) at least 15 weight percent silica,
      (b) alumina, in an amount providing an alumina-to-silica weight ratio of 15/85 to 80/20,
      (c) nickel or cobalt, or the combination thereof, in the form of metal, oxide, sulfide or any combination thereof, in an amount of 1 to 10 weight percent of said matrix, calculated as metal,
      (d) molybdenum or tungsten, or the combination thereof, in the form of metal, oxide, sulfide or any combination thereof, in an amount of 5 to 25 weight percent of said matrix, calculated as metal;
   (B) A crystalline zeolitic molecular sieve substantially in the ammonia or hydrogen form, substantially free of any catalytic loading metal or metals, said sieve further having a silica/alumina ratio above about 2.15, a unit cell size below about 24.65 angstroms and a sodium content below about 3 weight percent, calculated as $Na_2O$, said sieve further being in particulate form and being dispersed through said matrix; said catalyst composite being further characterized by an average pore diameter below 100 angstroms and a surface area above 200 square meters per gram; said catalyst composite being further characterized by hydrocracking activities and stabilities developed therein by heating said catalyst composite in an oxygen-containing gas stream at temperatures in the range 1200° to 1600° F. for 0.25 to 48 hours.

11. A catalyst composite as in claim 10, containing at least 0.1 ml. $H_2O$ per gram of said molecular sieve.

12. A catalyst composite as in claim 10, in which said gel matrix additionally comprises titanium, zirconium, thorium or hafnium or any combination thereof, in the form of metal, oxide, sulfide or any combination thereof, in an amount of 1 to 10 weight percent of said matrix, calculated as metal.

13. A hydrotreating process which comprises contacting a hydrocarbon feed containing substantial amounts of materials boiling above 200° F. and selected from the group consisting of petroleum distillates, solvent-deasphalted petroleum residua, shale oils and coal tar distillates, in a reaction zone with hydrogen and the catalyst of claim 1, at hydrotreating conditions including a temperature in the range 400° to 950° F., a pressure in the range 800 to 3500 p.s.i.g., a liquid hourly space velocity in the range 0.1 to 5.0, and a total hydrogen supply rate of 200 to 20,000 s.c.f. of hydrogen per barrel of feedstock, and recovering hydrotreated products from said reaction zone.

14. A process as in claim 13, wherein the $H_2O$ content of said catalyst is maintained in an amount of at least 0.1 ml. $H_2O$ per gram of said molecular sieve during at least a major portion of the on-stream period.

15. A process as in claim 13, wherein said hydrocarbon feed contains a substantial amount of organic nitrogen, and wherein ammonia is removed from the effluent from said reaction zone.

16. A process as in claim 13, wherein a gasoline product and a jet fuel product are recovered from the effluent from said reaction zone.

17. A process as in claim 16, wherein a portion of the effluent from said reaction zone boiling above the gasoline boiling range is hydrocracked in a second reaction zone in the presence of hydrogen and hydrocracking catalyst at hydrocracking catalyst at hydrocracking conditions including a temperature in the range 400° to 950° F., a pressure in the range 800 to 3500 p.s.i.g., a liquid hourly space velocity in the range 0.1 to 5.0, and a total hydrogen supply rate of 200 to 20,000 s.c.f. of hydrogen per barrel of feedstock, and wherein at least one hydrocracked product is recovered from said reaction zone.

References Cited
UNITED STATES PATENTS

| | | | |
|---|---|---|---|
| 3,140,253 | 7/1964 | Plank et al. | 208—120 |
| 3,132,087 | 5/1964 | Kelley et al. | 208—60 |
| 3,425,956 | 2/1969 | Baker et al. | 252—455 |

DELBERT E. GANTZ, Primary Examiner

A. RIMENS, Assistant Examiner

U.S. Cl. X.R.

208—60, 111; 252—455

PO-1050
(5/69)

UNITED STATES PATENT OFFICE
CERTIFICATE OF CORRECTION

Patent No. 3,558,471          Dated    January 26, 1971

Inventor(s)    JAMES R. KITTRELL

It is certified that error appears in the above-identified patent and that said Letters Patent are hereby corrected as shown below:

Col. 5, line 53, "substantially free" should read

--substantially in the ammonia or hydrogen form, substantially free--.

Col. 11, line 12, "conversion of products" should read

--conversion to products--.

Col. 12, line 64, "2175°F." should read --1275°F.--.

Col. 18, lines 13-14, "and hydrocracking catalyst at hydrocracking catalyst at" should re --and a hydrocracking catalyst at--.

Signed and sealed this 17th day of August 1971.

(SEAL)
Attest:

EDWARD M.FLETCHER,JR.
Attesting Officer

WILLIAM E. SCHUYLER, JR.
Commissioner of Patents